Sept. 1, 1942.   C. H. THAYER   2,294,430
CATALYTIC CONVERTER
Filed Aug. 3, 1940    2 Sheets-Sheet 1

INVENTOR
CLARENCE H. THAYER
BY
Ira L. Nickerson
ATTORNEY

Sept. 1, 1942.  C. H. THAYER  2,294,430
CATALYTIC CONVERTER
Filed Aug. 3, 1940   2 Sheets-Sheet 2

INVENTOR
CLARENCE H. THAYER
BY
*Ira L. Nickerson*
ATTORNEY

Patented Sept. 1, 1942

2,294,430

UNITED STATES PATENT OFFICE 2,294,430

CATALYTIC CONVERTER

Clarence H. Thayer, Media, Pa., assignor to Sun Oil Company, Philadelphia, Pa., a corporation of New Jersey Application August 3, 1940, Serial No. 350,183

6 Claims. (Cl. 23—288)

This invention relates to chemical reactions involving the use of contact material and is especially concerned with reaction converters and the assemblage thereof.

In the use of contact material for transforming or otherwise treating hydrocarbons according to recent advances in the art the contact material is subjected to variation in temperature due to difference in temperature at which the on-stream or producing reaction and the regeneration reaction or period are conducted, the contact material being cleaned during regeneration periods by burning any deposit thereon, in preparation for a later on-stream reaction. After long periods of use portions of the contact material may lose activity or ability to promote the desired reaction, for example, due to the uneven temperatures to which the contact material is subjected and the various converter parts, particularly reactant tubes and the heat exchange tubes, may deteriorate so as to necessitate removal and replacement. Converters now generally in use have a complicated arrangement of tubes in the reaction chamber for distributing reactants and collecting reaction products and also for conveying heat exchange fluid for controlling the temperature of the contact material. The tube arrangement or pattern presents some difficulty in removing readily the contact material when it becomes necessary to be replaced.

In the vapor phase treatment of hydrocarbons it is also necessary to prevent any deposit or accumulation of tar or liquid in the converter since there is a possibility of its becoming ignited and burning the contact material or converter parts during the regeneration period when the carbon deposit on the contact material is oxidized.

It is the aim of the present invention to overcome these difficulties and its objects are therefore to provide a converter which is constructed in sections in order to simplify removal and replacement of parts; to construct a converter with a reaction chamber for containing contact material and cooperating parts arranged therein to permit ready removal and replacement of parts; to prevent accumulation of matter in the converter which would affect deleteriously the reactions and to provide for the ready removal of contact material from the reaction chamber.

In order to illustrate the invention reference may be had to the accompanying drawings wherein concrete embodiments exemplifying the invention are shown with similar parts indicated by like reference characters, in which Fig. 1 is a vertical sectional view of a chemical converter taken substantially on the line 1—1 of Fig. 2, showing certain parts in elevation. For the purpose of clarity only a few of each type of tube employed in the converter are shown in this figure;

Figures 1, 3:
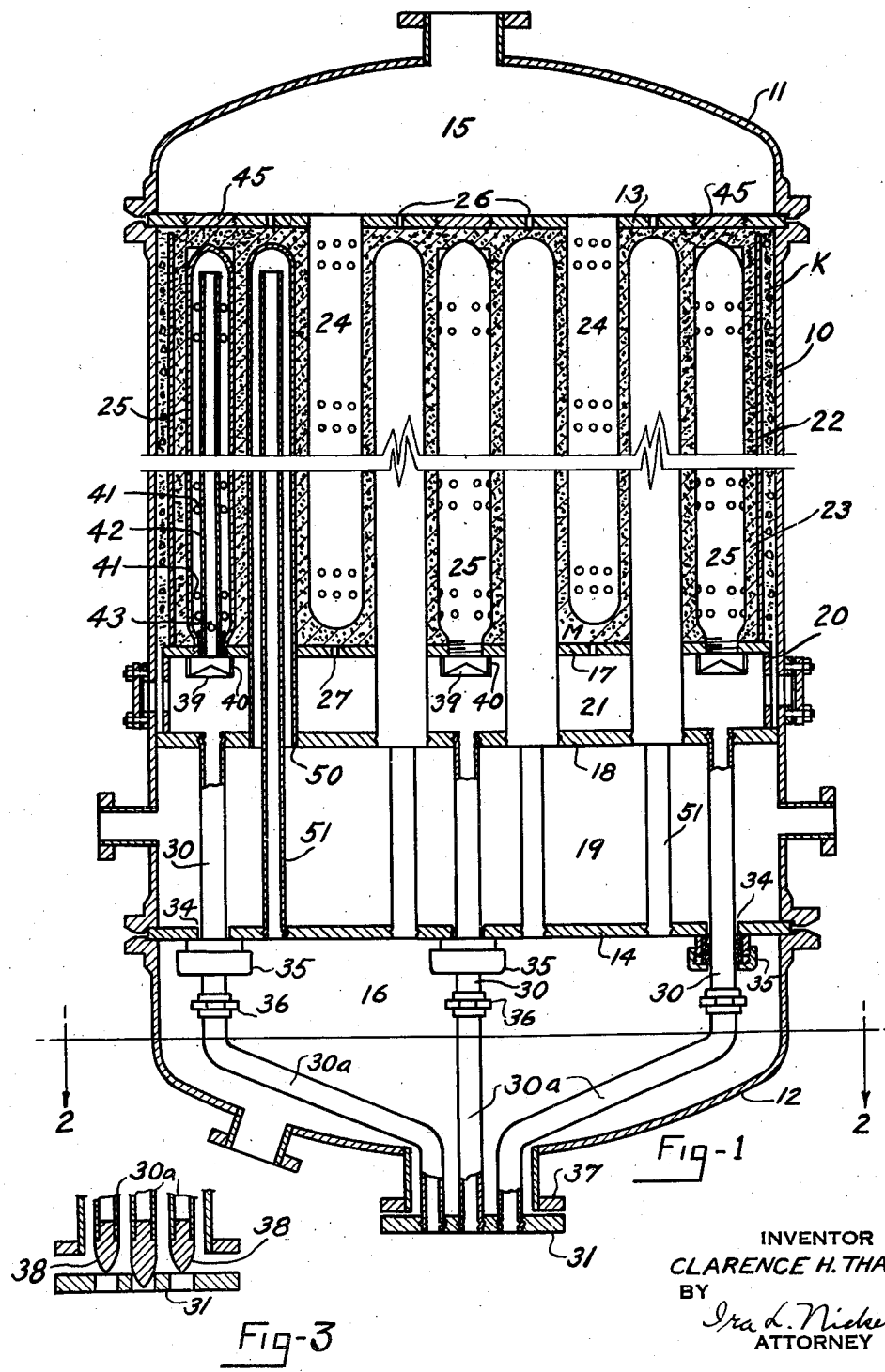
Fig. 3 is a detail, showing the method of mounting certain tubes in the converter.

The converter shown in Fig. 1 comprises a cylindrical casing which may be provided with an outer covering (not shown) of suitable heat insulating material. The casing is made up of several sections including a central section 10 and upper and lower end closure members 11 and 12, respectively, which have flanges thereon for cooperating with flanges on the central section to receive suitable lugs or other means for securing the closure members to the central section when the converter is set up for operation. Upper and lower transverse tube sheets 13 and 14, respectively, are positioned between the upper and lower closure members and the central section and these provide with the closure members a top manifolding chamber 15, a bottom manifolding chamber 16, and a central chamber therebetween. The central chamber is in turn divided into a plurality of chambers by means of a pair of spaced transverse walls 17 and 18, the latter of which is rigidly secured to the side wall of the central section 10 forming with the tube sheet 14 a manifolding chamber 19; the wall 18, in turn, supports the transverse wall 17 by means of a cylindrical ring 20 and forms with the wall 17 a manifolding chamber 21. The transverse wall 17 is spaced from the side wall of central section 10 and the wall 17, in turn, receives and supports a cylindrical shell 22 which forms the side wall of a reaction chamber 23 adapted to contain or to be filled with solid contact material M, which may be in the form of bits, fragments, or molded pieces and utilized to promote, enter into or in any way assist the desired reaction. The wall 17 supports the contact material and if necessary additional strengthening means may be provided in the chamber 21, such as studs supported by the wall 18. The space between the central section 10 and shell 22 may be filled with suitable insulating materials as indicated at K. To provide the manifold 21 and reaction chamber 23, the transverse wall 18 will be welded or otherwise fixed to central section 10 during the manufacture of the section and the cylindrical ring 20, transverse wall 17 and inner casing 22 may be manufactured as a unit and supported on the wall 18 when the converter is assembled.

Figure 2:
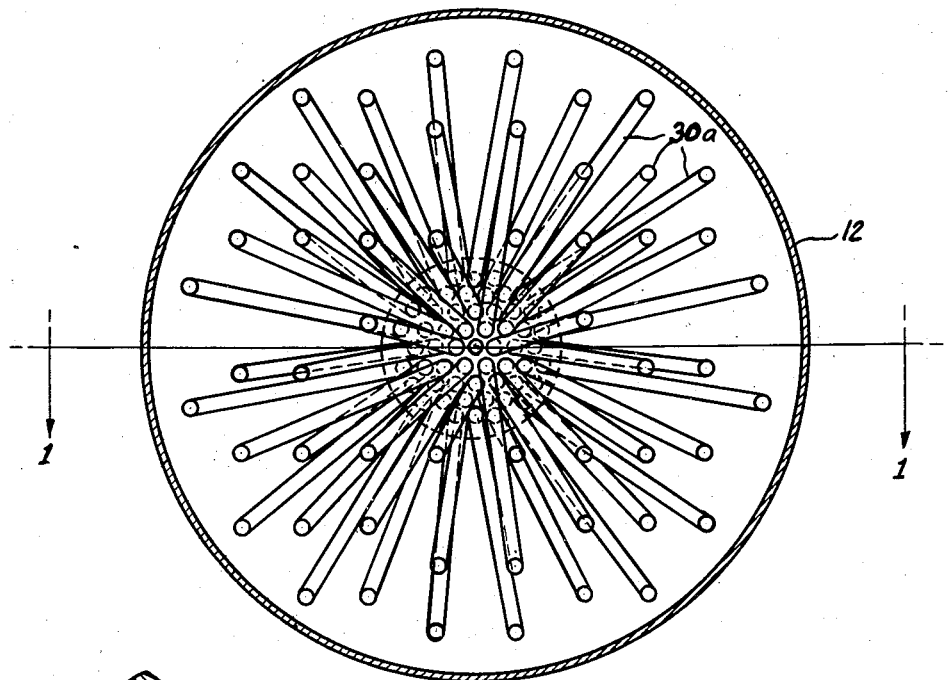
Fig. 2 is a transverse sectional view taken on the line 2—2 of Fig. 1 showing an arrangement of certain tubes used in the converter.

In Figs. 1 and 2 are shown the various groups of tubes employed during a reaction and their association with the manifolding chambers as well as the arrangement of the tubes which cooperate in removal of contact material from the reaction chamber.

The manifolding chambers 15 and 21 which are disposed adjacent and at either end of the reaction chamber 23 are provided respectively with a set of perforated tubes 24 and 25 which are utilized in the passage of fluid reactants from one of the manifolds in cross flow through the contact material to the other manifold. A plurality of apertures 26 and 27 are also provided in the transverse walls 13 and 17, respectively, to function as an alternate means for passing reactants in straight-through flow between these manifolds or to function as a means to supplement the cross flow of tubes 24 and 25. Reactants may be supplied directly to either manifolds 15 or 21. When proper precautions are taken to prevent the possibility of any tarry material or liquid globules entering with the reactant vapors the upper manifold may be used as there would be no accumulation of deposit in the upper manifold. However, if there is any possibility of liquid hydrocarbons accumulating in the converters during an on-stream reaction which might create a hazardous condition, particularly when the regeneration reaction is started or carried out, it is preferable to supply reactants to the bottom manifold 21, since provision readily may be made for removing the accumulated matter. To this end, a group of vapor inlet reactant tubes 30 are secured in the transverse wall 18 and have one end in communication with reactant manifold 21 and their other ends secured exteriorly of the closure 12 to a tube sheet 31. For convenience in assembling the tubes 30 they may be made up in two sections as indicated. The upper sections 30 are fixed to the transverse wall 18 and assembled along therewith to have free ends depending therefrom which extend through apertures 34 in the lower tube sheet 14 to which they are slidably secured by an expansion ring assembly indicated generally at 35. The lower sections 30a of these tubes are adapted to be assembled in the field and may have their upper ends welded to the free ends of the upper sections 30 or, as shown, a union 36 may be used for providing a joint sealed from the manifold 16.

In order to position the open ends of the tube sections 30a in a confined space such as the flanged opening 37 in the closure member 12, a plurality of guides 38, as indicated in Fig. 3, are provided which are insertable in the open ends of the tube sections 30a forming a cluster with the central guide being the longest in order to center the tube sheet 31 and the others being graduated in length in order to cooperate in assembling the tubes in the apertured tube sheet 31. When the tubes 30 are assembled in the converter they may be suitably manifolded with a reactant fluid supply chamber (not shown) and in the event of any liquid or tar entering with the vapors the liquid will tend to deposit in the inlet manifold 21 from which it will drain out through the tubes 30 when the supply of reactants is cut off or through which it may be drawn by applying a vacuum to the tubes or be forced by an inert fluid such as steam which may be supplied from manifold 15. In order to prevent fluid admitted to manifold 21 by tubes 30 from entering directly into the tubes 25 and to diffuse vapors within the manifold, cone-shaped deflector plates 39 are provided in the manifold 21 and are positioned by pins 40 in front of the open ends of tubes 25. These deflector plates may also be mounted if desired over ports 27.

Figure 4:
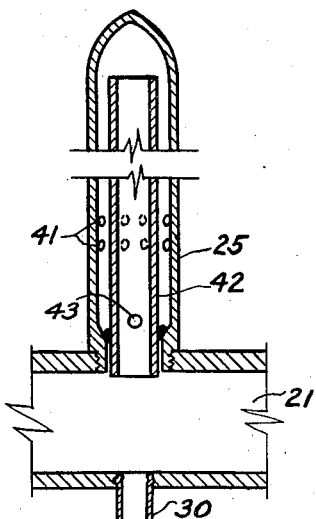
Fig. 4 is an enlarged sectional view of a detail of Fig. 1.

Referring to Figs. 1 and 4 there is shown an arrangement for preventing the tubes 25 from accumulating a body of liquid therein, for example, such an amount as would tend to block or close the perforations 41 in these tubes and consequently prevent vapors from passing between the manifold 21 and the contact material. To this end there is utilized an inner open end tube 42 which is nested in the tube 25 and provided with one or more apertures 43 positioned adjacent the lower tube end to act as drains for removing any accumulated liquid from tubes 25 and directing it to manifold 21 where it will in turn drain or be forced through the tubes 30.

In addition to their function as supply and/or drain members for manifold 21, tubes 30 may also be used for removing contact material from the reaction chamber. In order to accomplish this it is necessary to first arrange for removal of the contact material from the reaction chamber to the manifold 21. This may be accomplished in several ways, for example, the contact material may be disintegrated into a liquid or sludge state by suitable solvents, such for example as a caustic soda solution, and pass from the reaction chamber through the perforations 27 in the reaction chamber bottom wall 17 to manifold 21 from where it can be withdrawn through the tubes 30, or, if desired, plugged openings of enlarged size similar to the plugged openings 45 in top tube sheet 13 of Fig. 1 may be provided in the reaction chamber bottom wall 17 through which the contact material in its original state may pass upon removal of the plugs. Another arrangement is to removably secure the tubes 25 in the bottom wall 17 and when necessary to remove the contact material, the tubes, which are accessible through the plugged apertures 45 in wall 13, may be withdrawn and the contact material permitted to fall into chamber 21 from which it will pass out of the converter by tubes 30.

In using the converter it is essential for the best operation to provide for temperature control of the contact material, for example by circulating a heat exchange fluid in indirect heat exchange relation with the contact material through tubes disposed in the contact material. One method is to use an outer closed end tube having its open end in communication with a heat exchange fluid manifold and an open end tube having one end nested in the outer tube and its other end in communication with an adjacent manifold with means for supplying the heat exchange fluid to one of the manifolds for passage through the tubes to the other manifold. Such an arrangement for heat exchange is shown in Fig. 1 wherein the manifold 19 is in communication with the open end of closed end tubes 50 which extend into the contact material and the adjacent manifold 16 with open end tubes 51 having one open end in communication therewith and the other nested within the closed end tubes 50. Although the heat exchange manifolds are shown as disposed below the reaction chamber, they would function as well above or along the side wall of central section 10 of the converter.

Although one particular arrangement for carrying out the invention is shown, it is to be considered only as exemplary of the invention which is to be limited only by the scope of the appended claims.

I claim as my invention:

1. Apparatus for carrying out chemical reactions comprising a casing having side and top and bottom end walls, upper and lower transverse partitions extending across the casing providing a reaction chamber therebetween for containing contact material, said partitions being apertured for the passage of reactants through the reaction chamber, an upper tube sheet extending across the casing in spaced relation with said lower partition forming a reactant manifold below the reaction chamber, a lower tube sheet spaced from the upper tube sheet and bottom end wall forming therewith upper and lower heat exchange fluid manifolds, an outer nested imperforate tube having a closed end positioned within said reaction chamber and an open end secured to said upper tube sheet and communicating therethrough with said upper heat exchange manifold, an inner nested imperforate tube having one open end spaced from the closed end of said outer tube and its other open end secured to said lower tube sheet and communicating therethrough with said lower heat exchange manifold, and conduit means secured to said upper tube sheet and communicating therethrough with said reactant manifold, said conduit means extending downwardly through said lower tube sheet and said heat exchange fluid manifolds.

2. Apparatus for carrying out chemical reactions comprising a casing having side and top and bottom end walls, upper and lower transverse partitions extending across the casing providing a reaction chamber therebetween for containing contact material, said partitions being apertured for the passage of reactants through the reaction chamber, an upper tube sheet extending across the casing in spaced relation with said lower partition forming a reactant manifold below the reaction chamber, a lower tube sheet spaced from the upper tube sheet and bottom end wall forming therewith upper and lower heat exchange fluid manifolds, an outer nested imperforate tube having a closed end positioned within said reaction chamber and an open end secured to said upper tube sheet and communicating therethrough with said upper heat exchange manifold, an inner nested imperforate tube having one open end spaced from the closed end of said outer tube and its other open end secured to said lower tube sheet and communicating therethrough with said lower heat exchange manifold, conduit means secured to said upper tube sheet and communicating therethrough with said reactant manifold, said conduit means extending downwardly through said lower tube sheet and said heat exchange fluid manifolds, and means permitting relative movement between the said lower tube sheet and said conduit means.

3. Apparatus for carrying out chemical reactions comprising a casing having side and top and bottom end walls, upper and lower transverse partitions extending across the casing providing a reaction chamber therebetween for containing contact material, said partitions being apertured for the passage of reactants through the reaction chamber, an upper tube sheet extending across the casing in spaced relation with said lower partition forming a reactant manifold below said reaction chamber, a lower tube sheet spaced from the upper tube sheet and bottom end wall forming therewith upper and lower heat exchange fluid manifolds, a series of outer nested imperforate tubes each having a closed end positioned within said reaction chamber and an open end secured to said upper tube sheet and communicating therethrough with said upper heat exchange fluid manifold, a series of inner nested imperforate tubes each having one open end spaced from the closed end of an outer tube and an open end secured to said lower tube sheet and communicating therethrough with said lower heat exchange fluid manifold, conduit means secured to said upper tube sheet to communicate with said reactant manifold and extending downwardly through said lower tube sheet and said heat exchange fluid manifolds for passing reactant fluid to said reactant manifold, and deflecting means within said reactant manifold for diffusing fluid entering the manifold from said conduit means.

4. Apparatus for carrying out chemical reactions comprising a casing having side and top and bottom end walls, upper and lower transverse partitions extending across the casing providing a reaction chamber therebetween for containing contact material, said partitions being apertured for the passage of reactants through the reaction chamber, an upper tube sheet extending across the casing in spaced relation with said lower partition forming a reactant manifold below the reaction chamber, a lower tube sheet spaced from the upper tube sheet and bottom end wall forming therewith upper and lower heat exchange fluid manifolds, a series of outer nested imperforate tubes each having a closed end positioned within said reaction chamber and an open end secured to said upper tube sheet and communicating therethrough with said upper heat exchange fluid manifold, a series of inner nested imperforate tubes each having one open end spaced from the closed end of an outer tube and an open end secured to said lower tube sheet and communicating therethrough with said lower heat exchange fluid manifold, a plurality of conduits secured in symmetrical arrangement in said upper tube sheet and communicating therethrough with said reactant manifold, said conduits having open ends extending downwardly through said lower tube sheet and said heat exchange fluid manifolds to have their open ends grouped and secured in a confined area of said bottom end wall.

5. Apparatus for carrying out chemical reactions comprising a casing having side and top and bottom end walls, upper and lower transverse partitions extending across the casing providing a reactant chamber therebetween for containing contact material, said partitions being apertured for the passage of reactants through the reaction chamber, a set of reactant fluid conducting units comprising a plurality of perforate conduits each having a closed end within the reaction chamber and an open end removably secured in an aperture of said lower partition, an upper tube sheet extending across the casing in spaced relation with said lower partition forming a reactant manifold below said reaction chamber in communication with said perforate conduits, a lower tube sheet spaced from the upper tube sheet and bottom end wall forming therewith upper and lower heat exchange fluid manifolds, a series of outer nested imperforate tubes each having a closed end positioned within said reaction chamber and an open end secured to said upper tube sheet and communicating therethrough with said upper heat exchange fluid manifold, a series of inner nested imperforate tubes each having one open end spaced from the closed end of an outer tube and an open end secured to said lower tube sheet and communicating therethrough with said lower heat exchange fluid manifold, conduits secured to said upper tube sheet and communicating therethrough with said reactant manifold, said conduits extending downwardly through said lower tube sheet and said heat exchange fluid manifolds.

6. Apparatus for carrying out chemical reactions comprising a casing having side and top and bottom end walls, upper and lower transverse partitions extending across the casing providing a reaction chamber therebetween for containing contact material, said partitions being apertured for the passage of reactants through the reaction chamber, a set of reactant fluid conducting units comprising a plurality of perforate outer conduits each having a closed end within the reaction chamber and an open end removably secured in an aperture of said lower partition and a plurality of inner conduits each having one open end positioned in registration with the open end of the outer conduit and its other open end positioned adjacent the closed end of the outer conduit, sealing means between said conduits adjacent the open end of the outer conduit and an apertured area in the inner conduit above said sealing means, an upper tube sheet extending across the casing in spaced relation with said lower partition forming a reactant manifold below the reaction chamber, a lower tube sheet spaced from the upper tube sheet and bottom end wall forming therewith upper and lower heat exchange fluid manifolds, a series of outer nested imperforate tubes each having a closed end positioned within said reaction chamber and an open end secured to said upper tube sheet and communicating therethrough with said upper heat exchange fluid manifold, a series of inner nested imperforate tubes each having one open end spaced from the closed end of an outer tube and an open end secured to said lower tube sheet and communicating therethrough with said lower heat exchange fluid manifold, conduits secured to said upper tube sheet and communicating therethrough with said reactant manifold, said conduits extending downwardly through said lower tube sheet and said heat exchange fluid manifolds.

CLARENCE H. THAYER.